April 9, 1929.    H. MULLER ET AL    1,708,797
PIE OR CAKE PAN
Filed Oct. 10, 1928    2 Sheets-Sheet 1
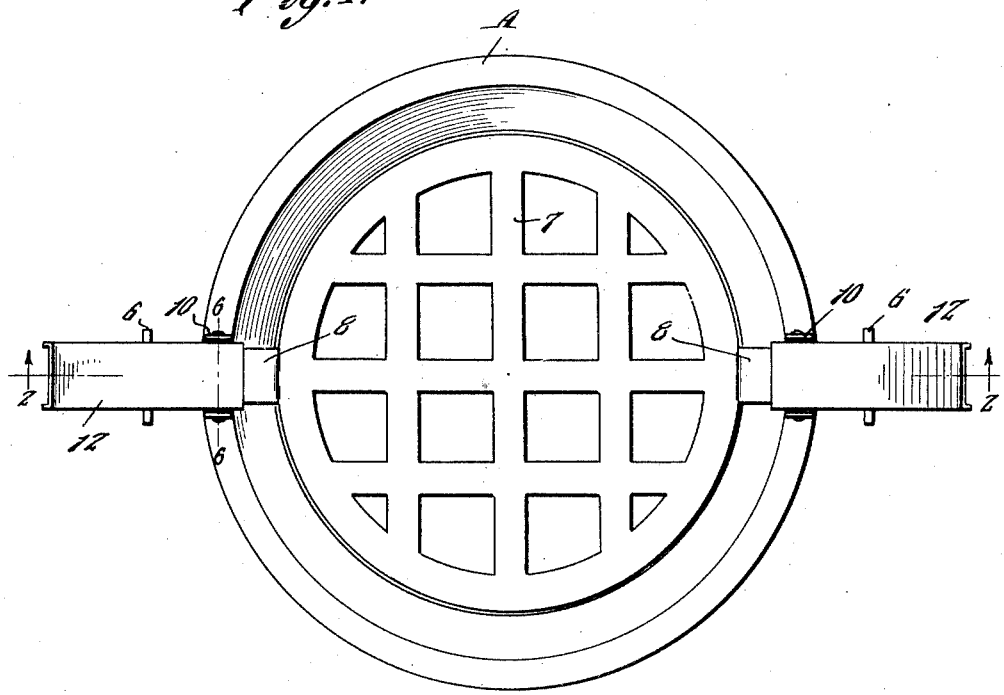
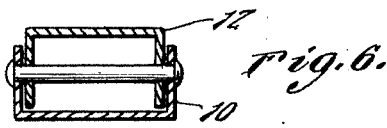
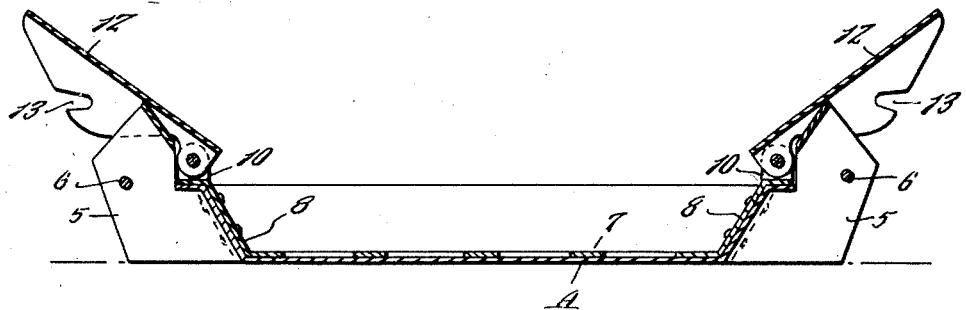
Inventors
Herman Muller
Adolf Nafziger
By Clarence A. O'Brien
Attorney April 9, 1929.  H. MULLER ET AL  1,708,797
PIE OR CAKE PAN
Filed Oct. 10, 1928  2 Sheets-Sheet 2
Fig. 3.
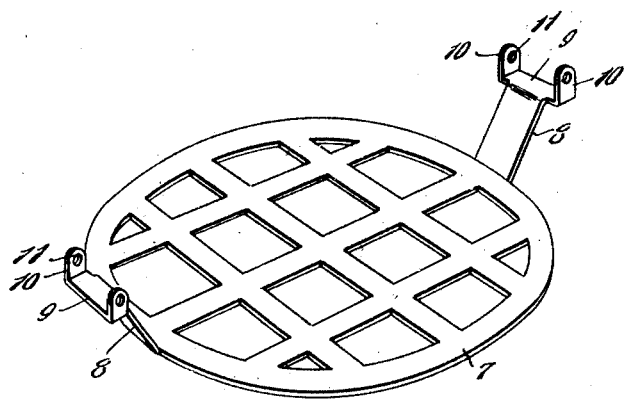
Fig. 4.
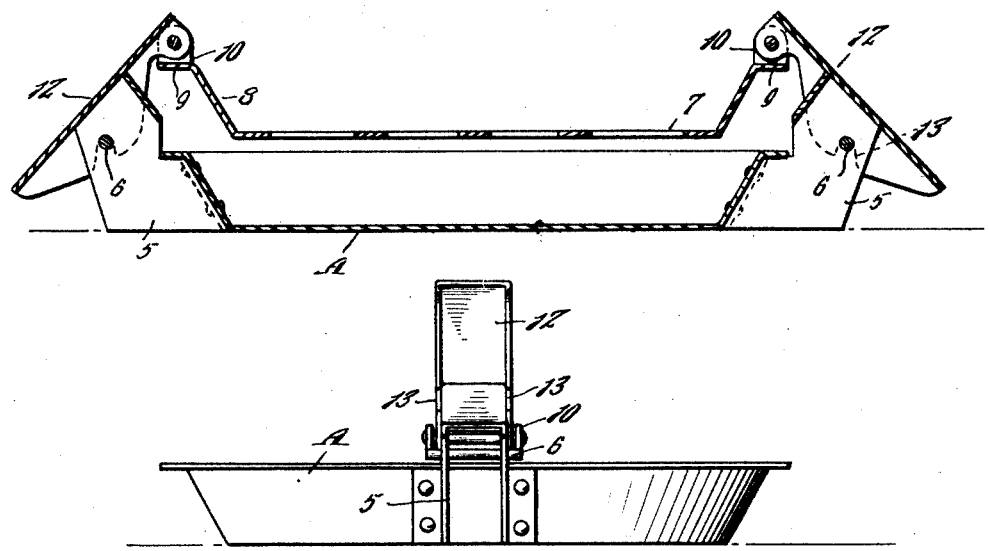
Fig. 5.
Inventors
*Herman Muller*
*Adolf Nafziger*
By *Clarence A. O'Brien*
Attorney Patented Apr. 9, 1929.

1,708,797

UNITED STATES PATENT OFFICE.

HERMAN MULLER AND ADOLPH NAFZIGER, OF CORAOPOLIS, PENNSYLVANIA.

PIE OR CAKE PAN.

Application filed October 10, 1928. Serial No. 311,584.

This invention relates to new and useful improvements in pie or cake pans, and aims to provide a pan of this character that is equipped with means to facilitate the lifting of a cake or pie out of the pan immediately after the same has been taken out of the oven without any injury whatsoever to the baked product, allowing at the same time, the air to get at the bottom of the cake or pie, thus, expediting the drying and cooling process. The primary object of this invention resides in the provision of a pie pan that is equipped with means as above set out and wherein said means is of a simple and inexpensive nature, preferably forming a component part of a pie pan rather than an attachment for pans already in use. Furthermore, the nature of the invention is such that a pie or cake may be quickly raised from the pan and supported in position without any liability of the pie or cake falling from its position above the pan.

With the foregoing and other objects in view as the nature of the invention will be better understood, the same comprises the novel form, combination and arrangement of parts hereinafter more fully described, shown in the accompanying drawings and claimed.

In the drawings wherein like reference characters indicate corresponding parts throughout the same:

Figure 1 is a top plan view of our improved pie pan.

Figure 2 is a detail longitudinal section, the elevating means being illustrated as in lowered position.

Figure 3 is a perspective of the pie and cake supporting and elevating plate.

Figure 4 is a view similar to Figure 2 illustrating the plate as in raised pie or cake supporting position.

Figure 5 is an edge elevation of the pan in back of one of the plate elevating units, and Figure 6 is a detail transverse section taken substantially upon the line 6—6 of Figure 1.

Now having particular reference to the drawing A designates generally a conventional pie or cake pan incorporated with which is my improved elevating and supporting mechanism. This mechanism resides in the provision of a pair of brackets 5—5 secured to the outer surface of the side wall of the pan A at directly opposed points. These brackets are preferably of inverted U-shaped formation and are secured to the pan through rivets, welding or the like. Furthermore the upper ends of these brackets extend beyond the upper edge of the pan and the top walls thereof are inclined from the outer toward the inner side of the pan, see Figure 4.

At a point directly above the upper edge of the pan A and toward the outer edge of each bracket a pin 6 is extended through the side walls of each bracket, the opposite ends thereof projecting beyond said side walls as clearly illustrated in Figures 1 and 5. Adapted for normal disposition within the pan A and upon the bottom wall thereof is a supporting and elevating plate 7 of grille formation, the edge of this plate at directly opposed points being equipped with upwardly and outwardly extending tongues 8—8, the upper ends of which are bent outwardly to provide horizontal portions 9—9, the opposite ends of each of which are provided with upstanding ears 10—10 having registering openings 11 in their upper ends. Complemental to each tongue 8 to the grille plate 7 is a lever 12 of substantial U-formation in cross section, the side walls of each lever at their inner ends being pivoted to the ears 10—10 of the adjacent tongue 8 as clearly illustrated in Figure 4. Adjacent their lower ends the side walls of each lever 12 are formed with hook shaped notches 13—13 for receiving the opposite ends of the adjacent bracket carrying pin 6. Obviously when these levers are supported upon the pins 6—6 the grille plate 7 will be maintained in elevated position with respect to the pan A, the heavier the pie or cake, the greater the binding the action between the lever and their supporting pins to prevent the falling of the plate. Obviously, however, when it is desired to lower the plate into the pan, the levers are raised from the hooks, then affording handles for the plate to enable the same to be lowered in steady manner into position upon the outer wall of the pan.

In view of the foregoing description when considered in conjunction with the accompanying drawings, it will be apparent that we have provided a novel, simple, useful, and generally inexpensive pie or cake pan that is equipped with means whereby the pies or cakes may be bodily raised from the pan without danger of breaking the material and wherein the pie or cake may be supported in position above the pan for cooling purposes. Even though we have herein shown and described the invention as consisting of certain detailed structural elements it is nevertheless to be understood that some changes may be made therein without affecting the spirit and scope of the appended claims.

Having thus described the invention what we claim as new and desire to secure by Letters Patent is:—

1. In a device of the character described, a pan open at its top side, means associated with opposed points of the pan and extending above the open top thereof, handle levers adapted for detachable association with said means above the top of the pan, an elevating and supporting plate adapted for engagement within the pan and for rest upon the bottom wall thereof, and pivotal connections between the inner ends of said levers and opposed points of the plate whereby the plate may be raised or lowered and supported in raised position by reason of said levers engaging the means associated with said pan.

2. In a device of the character described, a pie pan, a plate adapted to be arranged in and normally supported upon the bottom wall of the pan, a pair of handle levers pivoted at opposed points to the plate and means between the levers and opposed points at the outer side of the pan whereby the levers may be detachably secured thereto in such a manner as to maintain the plate in elevated position.

In testimony whereof we affix our signatures.

HERMAN MULLER.
ADOLPH NAFZIGER.